United States Patent Office 2,715,634
Patented Aug. 16, 1955

2,715,634

PROCESS FOR THE PRODUCTION OF BIOCYTIN

John Weijlard, Maplewood, and Max Tishler, Westfield, N. J., assignors to Merck & Co., Inc., Rahway, N. J., a corporation of New Jersey No Drawing. Application September 9, 1953,
Serial No. 379,293

6 Claims. (Cl. 260—309.7)

This invention relates to a novel process for the preparation of ε-N-(D-biotinyl)-L-lysine, also known as biocytin.

Biocytin is a growth-promoting substance related to biotin. Heretofore, it has been isolated from such sources as autolyzed yeast extracts and has also been produced by synthetic methods. However, these procedures are long and tedious and furnish unsatisfactory quantities of biocytin relative to the amount of starting materials employed.

It is an object of this invention to provide an improved process for the preparation of ε-N-(D-biotinyl)-L-lysine from readily available starting materials, which makes possible the preparation of adequate amounts of this growth-promoting substance.

In accordance with the process of the present invention, an ester of biotin which has the structural formula

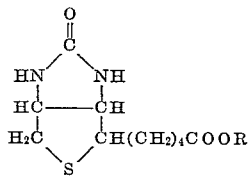

wherein R is alkyl such as ethyl, propyl, butyl and isobutyl, aryl such as phenyl or aralkyl such as benzyl, is condensed with L-lysine which may be identified by the following formula

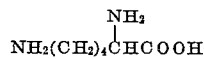

It has been found that these two compounds, i. e., an ester of biotin and L-lysine, may be condensed in the presence of an inert organic solvent to yield ε-N-(D-biotinyl)-L-lysine (biocytin), a compound having the structural formula

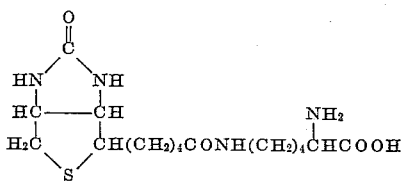

It is preferred for reasons of economy to employ an excess of the L-lysine in the reaction. This is not necessary, however, and equimolar amounts of the two reactants or excess biotin ester can be employed if desired.

The time and temperature variables of the reaction are interdependent. A temperature range of about 80° C. to about 150° C. is operative and the preferred temperature is 120°–130° C. The reaction time may vary greatly depending on the temperature. A reaction time of about twenty-four hours at the preferred temperature appears optimum.

A solvent system is employed in which both the biotin ester and L-lysine are appreciably soluble. A system wherein biotin ester is soluble in hot toluene and L-lysine is soluble in trichlorobenzene is the preferred system, although other hydrocarbons such as benzene and xylene may be employed. Petroleum ether-trichlorobenzene has also been found successful.

In accordance with a preferred method for carrying out the present invention, to a mixture of toluene and trichlorobenzene are added L-lysine and biotin methyl ester, the lysine being present in excess. The biotin methyl ester is quite soluble in hot toluene and the L-lysine dissolves slowly in trichlorobenzene. The mixture is then refluxed in an inert atmosphere in order to effect the condensation.

At the end of the desired reaction period the toluene is removed by distillation and ether added to the residue, whereupon the unreacted biotin methyl ester and lysine, together with the formed ε-N-(D-biotinyl)-L-lysine precipitate out. The total solids are treated with water which dissolves the ε-N-(D-biotinyl)-L-lysine and unchanged lysine but not the biotin methyl ester which is recovered by filtration. The unreacted biotin methyl ester is quite stable and can be reused as starting material and reacted with additional L-lysine.

The ε-N-(D-biotinyl)-L-lysine is then isolated by concentrating the aqueous extract to dryness under reduced pressure. The crude product thus obtained is subjected to a countercurrent distribution procedure employing the system water: cresol-chloroform for the recovery of pure ε-N-(D-biotinyl)-L-lysine.

The biotin alkyl ester employed as one of the starting materials in this process may be prepared by reacting biotin with a thionyl halide such as thionyl chloride to form biotin acid halide and reacting the latter compound with an alkanol such as methanol to form the hydrohalide of biotin alkyl ester. The biotin alkyl ester can be isolated by suspending the hydrohalide in water and adjusting the pH of the mixture to alkalinity, whereupon the free biotin alkyl ester can be recovered by filtration.

The other starting material, i. e., L-lysine is prepared by reacting L-lysine monohydrochloride with silver oxide and recovering L-lysine.

The following examples illustrate specific embodiments of this invention:

EXAMPLE 1

*Preparation of ε-N-(D-biotinyl)-L-lysine (biocytin)*

Thirteen and three-tenths grams of biotin methyl ester (0.051 mole) was placed in a 1 liter three necked flask equipped with reflux condenser, stirrer, thermometer and nitrogen inlet. Eighteen grams of L-lysine (0.12 mole) was added to the biotin methyl ester followed by 400 cc. of toluene and 200 cc. of trichlorobenzene. The mixture was heated until about 10 cc. of toluene was distilled off to remove traces of moisture, then the mixture was refluxed with rapid stirring under a blanket of nitrogen for twenty-four hours. The internal temperature of the reaction mixture was 122°–124° C.

The mixture was then distilled under reduced pressure to remove the toluene. Five hundred cc. of anhydrous ether was added to the mixture whereupon biotin methyl ester lysine and ε-N-(D-biotinyl)-L-lysine precipitated from solution. The precipitate was filtered off, washed with ether, then water to remove the lysine and the biocytin, and dried. The biotin ester thus obtained is suitable for further reactions with fresh L-lysine.

The combined aqueous filtrate and washings were adjusted to pH 6.5 with about 30 cc. of 10% hydrochloric acid, and concentrated under reduced pressure to dryness. The residue was dissolved in 50 cc. of water and the solution adjusted to pH 3 with hydrochloric acid. The solution was subjected to a ten plate countercurrent distribution between 50 cc. volumes of water (pH 3) and o-cresolchloroform mixture (1:1), the latter being the moving phase. Plates three to nine inclusive were poured into 7.5 liters of petroleum ether and agitated. The lower aqueous layer was separated and the organic layer was extracted three times with 200 cc. portions of water. The combined aqueous extracts were washed five times with 200 cc. portions of ether, then concentrated under reduced pressure to dryness below 40° C. The residue of 14 gm. was dissolved in 75 cc. of water, 1 gm. of acid washed activated carbon was added. The mixture was filtered and washed five times with 5 cc. portions of water. To the clear, straw-colored solution was added 1000 cc. of acetone, the precipitated product collected on a filter, washed three times with 50 cc. portions of acetone and dried under reduced pressure over sulfuric acid. The ε-N-(D-biotinyl)-L-lysine thus obtained had a melting point of 241–243° C., [α] = +53° (C=1, 0.1 N sodium hydroxide).

Calculated for $C_{16}H_{28}O_4N_4S$: C, 51.59; H, 7.58; N, 15.04. Found: C, 51.52; H, 7.57; N, 15.22.

*Preparation of the starting material biotin methyl ester*

The biotin methyl ester utilized as a starting material in the foregoing process was prepared in accordance with the following two-step procedure:

1. Seventy cubic centimeters of thionyl chloride was added to ten grams of anhydrous biotin (0.041 mole) and the mixture was stirred gently for from five to ten minutes until the biotin had dissolved. The mixture was distilled under reduced pressure at room temperature to remove the excess thionyl chloride. The residual biotin acid chloride was held at a reduced pressure of 1 millimeter for one-half hour.

2. Fifty cubic centimeters of absolute methanol was added rapidly to the biotin acid chloride. Almost instantly the biotin acid chloride was dissolved in the methanol in an exothermic reaction. The methanol was removed under reduced pressure leaving as a residue biotin methyl ester hydrochloride.

One hundred cubic centimeters of water was added to the residue of biotin methyl ester hydrochloride. Sodium bicarbonate was added to the suspension until effervescence ceased and the solution was alkaline to litmus, whereupon biotin methyl ester separated from solution. The mixture was filtered. The precipitate was washed four times with 30 cc. portions of water and dried under reduced pressure over sulfuric acid. The biotin methyl ester thus obtained had a melting point of 162°–164° C.

*Preparation of the starting material L-lysine*

The L-lysine utilized as a starting material in the foregoing process was prepared in accordance with the following procedure:

Eighteen and three tenths grams of L-lysine monohydrochloride (0.1 mole) was dissolved in 100 cc. of water and 18 gms. silver oxide (0.077 mole) was added. The mixture was agitated vigorously for several minutes until the reaction was completed. The mixture was then filtered to remove the silver chloride which precipitated from solution and the precipitate washed with water. Hydrogen sulfide was bubbled into the combined filtrates to precipitate any silver remaining in solution as silver sulfide. The use of a large excess of hydrogen sulfide was avoided. The mixture was filtered to remove the silver sulfide precipitate. The filtrate was concentrated under reduced pressure to a thick syrup. About 100 cc. of absolute alcohol was added to the thick syrup followed by 200 cc. of ether, whereupon L-lysine precipitated from solution. The mixture was filtered and the L-lysine precipitate washed with ether and dried under reduced pressure. The L-lysine had a melting point of 207°–209° C.

EXAMPLE 2

*Preparation of ε-N-(D-biotinyl)-L-lysine (biocytin)*

Two and nine-tenths grams of biotin ethyl ester was placed in a 500 cc. three-necked flask equipped with reflux condenser, stirrer, thermometer and nitrogen inlet. Three and six-tenths grams of L-lysine was added to the biotin ethyl ester followed by 90 cc. of toluene and 50 cc. of trichlorobenzene. The mixture was heated until about 5 cc. of toluene was distilled off to remove traces of moisture, then the mixture was refluxed with rapid stirring under a blanket of nitrogen for twenty-four hours. The internal temperature of the reaction mixture was 122°–124° C.

The mixture was distilled under reduced pressure to remove the toluene. 150 cc. of anhydrous ether was added to the mixture whereupon biotin ethyl ester, lysine and ε-N-(D-biotinyl)-L-lysine precipitated from solution. The precipitate was filtered off, washed five times with 25 cc. portions of ether and air dried at 50° C. The solid product was treated with 35 cc. of water. The insoluble material was removed by filtration, washed three times with 10 cc. portions of water and dried under reduced pressure to yield 1.6 gm. biotin ethyl ester, having a melting point of 126°–128° C. Biotin ethyl ester is very stable and may be stored and re-used in the process.

The combined filtrate and washings were adjusted to pH 6.5 by adding about 10 cc. of 10% hydrochloric acid, then concentrated under reduced pressure to dryness. The residue was dissolved in 15 cc. of water and the solution adjusted to pH 3 with hydrochloric acid. The solution was subjected to a ten plate countercurrent distribution between 15 cc. volumes of water (pH 3) and o-cresol-chloroform mixture (1:1) the latter being the moving phase. Plates three to nine inclusive were poured into 2.5 liters of petroleum ether and agitated. The lower aqueous layer was separated and the organic layer was extracted three times with 60 cc. portions of water. The combined aqueous extracts were washed five times with 60 cc. portions of ether, then concentrated under reduced pressure to dryness below 40° C. The residue was dissolved in 20 cc. portions of water, 0.1 gm. of acid washed activated carbon was added. The mixture was filtered and washed with 5 cc. portions of water. To the clear, straw-colored solution was added 250 cc. of acetone, the precipitated product was collected on a filter, washed three times with 10 cc. portions of acetone and dried under reduced pressure over sulfuric acid. The ε-N-(D-biotinyl)-L-lysine thus obtained had a melting point of 233°–237° C., $[\alpha]_D = +53°$.

It should be understood that various changes may be made in our process as herein described without affecting the results obtained. Thus, various modifications of conditions as to time, temperature, alkalinity, acidity, etc., and various changes in procedure differing from those herein given as illustrative of the preferred embodiments of this invention may be made without departing from the scope thereof

What is claimed is:

1. The process for manufacturing ε-N-(D-biotinyl)-L-lysine which comprises condensing L-lysine with a biotin ester having the formula

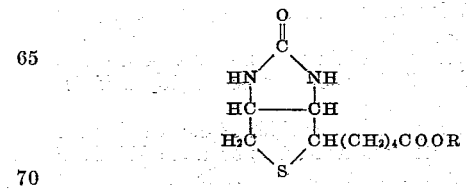

wherein R is selected from the group consisting of alkyl, aryl and aralkyl in the presence of a mixture of inert organic solvents for the reactants, one of these solvents being trichlorobenzene to form ε-N-(D-biotinyl)-L-lysine.

2. The process for manufacturing ε-N-(D-biotinyl)-L-lysine which comprises condensing a biotin alkyl ester with L-lysine in the presence of a mixture of inert organic solvents for the reactants, one of the solvents being trichlorobenzene to form ε-N-(D-biotinyl)-L-lysine.

3. The process for manufacturing ε-N-(D-biotinyl)-L-lysine which comprises condensing biotin methyl ester with L-lysine in the presence of a mixture of inert organic solvents for the reactants, one of the solvents being trichlorobenzene to form ε-N-(D-biotinyl)-L-lysine.

4. The process for manufacturing ε-N-(D-biotinyl)-L-lysine which comprises condensing biotin ethyl ester with L-lysine in the presence of a mixture of inert organic solvents for the reactants, one of the solvents being trichlorobenzene to form ε-N-(D-biotinyl)-L-lysine.

5. The process for manufacturing ε-N-(D-biotinyl)-L-lysine which comprises condensing biotin methyl ester with L-lysine in the presence of a mixture of toluene and trichlorobenzene to form ε-N-(D-biotinyl)-L-lysine.

6. The process for manufacturing ε-N-(D-biotinyl)-L-lysine which comprises condensing biotin ethyl ester with L-lysine in the presence of a mixture of toluene and trichlorobenzene to form ε-N-(D-biotinyl)-L-lysine.

References Cited in the file of this patent

UNITED STATES PATENTS 2,519,530     Wolf et al. _____ Aug. 22, 1950

OTHER REFERENCES

Wolf et al., J. Am. Chem. Soc., vol. 74, pp. 2002–3 (1952).